Nov. 27, 1956  A. F. A. BARTELS ET AL  2,771,633
METHOD OF PREPARING FINLESS FISH FILLETS
Filed July 27, 1953
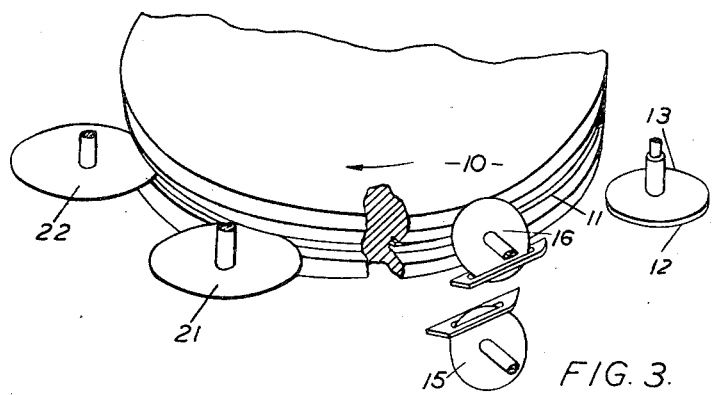
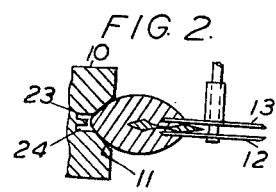
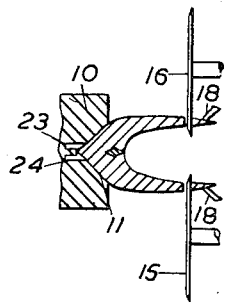
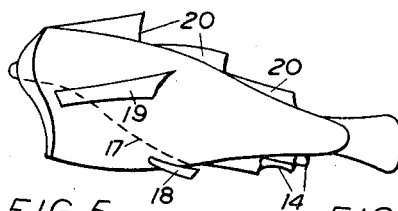
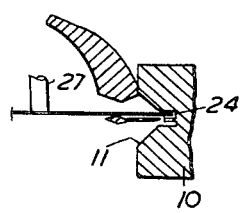
Inventors
A. F. A. BARTELS and
P. F. W. JOBMANN
By Richards & Geier
Attorneys

United States Patent Office 2,771,633
Patented Nov. 27, 1956

2,771,633

METHOD OF PREPARING FINLESS FISH FILLETS

Alfred Friedrich Adolf Bartels and Paul Friedrich Wilhelm Jobmann, Lubeck, Germany, assignors to Nordischer Maschinenbau Rud. Baader, Lubeck, Germany Application July 27, 1953, Serial No. 379,243

Claims priority, application Germany January 20, 1953

2 Claims. (Cl. 17—45)

This invention relates to a method and means for the preparation of fin-free fillets of fish.

In known devices, the removal of the fins causes difficulty if there are deep-seated fin roots, such as in the case of whitings. Here the belly fins located on the lower side of the belly as well as the breast fins located behind the gills and the back fins cause most of the trouble while the caudal fin and the fins located between the anus and the caudal fin are normally removed with the backbone of the fish.

It is an object of the instant invention to provide a method and means for the preparation of fillets from fish having deep-seated fins.

Other objects of the instant invention will become apparent in the course of the following specification.

In the attainment of the aforesaid objectives, a headless fish with outwardly directed belly is passed between spaced circular knives so arranged that the various fins and roots are removed in various stages until in the final stage a lower and an upper fillet are removed entirely free from the fins and the roots thereof.

The invention will appear more clearly from the following detailed description when taken in conjunction with the accompanying drawings showing by way of example a preferred embodiment of the invention concept.

In the drawings:

Figure 1 is a schematic view of the arrangement of the tools for the preparation of fin-free fillets constructed in accordance with the principles of this invention;

Figure 2 is a sectional view through a fish showing the cuts between the anus and caudal fins;

Figure 3 is a sectional view through a fish showing the severing at the belly lobes;

Figure 4 shows the line along which the belly lobes are severed;

Figure 5 is a sectional view through a fish showing the separation of the lower fillet half; and Figure 6 is a view similar to Figure 5 but showing the separation of the upper fillet half.

Referring now in greater detail to the drawings where like reference numerals indicate like parts, reference numeral 10 indicates a circular table in which a fish is firmly secured in a trough-shaped groove 11 in the edge of the table by any suitable means not shown and well known in the art. Guiding means as well as all control means for the tools and tools which are of no interest have been omitted for simplicity.

A pair of horizontally disposed vertically spaced circular knives 12, 13 are used for carrying out the cuts between the anus and caudal fins and Figure 2 shows how the cuts are made.

The vertically disposed and spaced rotating circular knives 15, 16 situated one above the other, provide the belly-lobe cuts. In this operation, the knives are so controlled by any suitable means not shown and well known in the art that the resulting cut is along a predetermined curve 17 as shown by the dash-line in Figure 4. By these knives, the belly fins 18 and the breast fins 19 on both sides of the fish are simultaneously severed.

In order to remove the back fins 20 and at the same time separate the fillets from each other, the horizontal circular fillet knife 21 makes a cut, starting from the belly side parallel to and below the backbone. The reason for first carrying out the cut underneath the backbone is that in the position of the fish the upper fillet with the backbone is securely held upon the knife 21 and pressed against the walls of the groove 11, whereby the lower fillet may be readily removed. The upper fillet is connected with the backbone after it leaves the knife 21 and is guided toward the second knife 22. After the knife 22 has completed its cutting operation the fillet will drop downwardly as illustrated in Figure 6. Guides which are not shown in the drawing are provided between the knives 21 and 22 for supporting the fillets. As will be seen in Figure 6, the second cut is made parallel to the backbone but closely above it from the belly side by means of a second horizontal circular knife 22 in circumferential spaced arrangement with the knife 21 so that the back strip containing the back fins and the fin roots is completely cut off and the second fillet freed. Since the fillet cutting knives 21 and 22 as will be seen in Figures 5 and 6 must move beyond the back of the fish, there are provided in the bottom of the trough-shaped groove 11 two grooves 23, 24 on opposite sides of the groove 11.

While there has been described and illustrated only one method and means for the preparation of fin-free fillets of fish, obviously other methods could be devised within the scope of the appended claims.

What is claimed is:

1. A method for the preparation of fin-free fillets of fish comprising the steps of removing the head of the fish, incising both sides of the fish by parallel cuts extending on both sides of the backbone between the anus and the caudal fin, cutting off separately the belly fins and breast fins on both sides cutting the fish for the removal of the lower fillet from the backbone, and cutting the fish for the removal of the upper fillet from the backbone.

2. A method for the preparation of fin-free fillets of fish comprising the steps of removing the head of the fish, incising the fish from the belly side by two parallel cuts extending on both sides of the backbone between the anus and the caudal fin, cutting off the belly fins, the breast fins and the belly lobes from the belly side, cutting the fish from the belly side for the removal of the lower fillet from the backbone, and cutting the fish from the belly for the removal of the upper fillet.

References Cited in the file of this patent

UNITED STATES PATENTS 2,497,554    Meissner _____ Feb. 14, 1950

FOREIGN PATENTS 676,814    Great Britain _____ Aug. 6, 1952